(12) United States Patent
Allbright et al.

(10) Patent No.: US 11,017,403 B2
(45) Date of Patent: May 25, 2021

(54) SYSTEMS AND METHODS FOR IDENTIFYING FRAUDULENT COMMON POINT OF PURCHASES

(71) Applicant: MASTERCARD INTERNATIONAL INCORPORATED, Purchase, NY (US)

(72) Inventors: Joshua A. Allbright, Valley Park, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 583 days.

(21) Appl. No.: 15/843,454

(22) Filed: Dec. 15, 2017

(65) Prior Publication Data
US 2019/0188722 A1 Jun. 20, 2019

(51) Int. Cl.
*G06Q 20/40* (2012.01)
*G06Q 20/34* (2012.01)
(Continued)

(52) U.S. Cl.
CPC ..... *G06Q 20/4016* (2013.01); *G06F 16/2282* (2019.01); *G06F 16/90335* (2019.01);
(Continued)

(58) Field of Classification Search
CPC .................................................. G06Q 20/4016
See application file for complete search history.

(56) References Cited

U.S. PATENT DOCUMENTS 6,254,000 B1 7/2001 Degen et al.
7,580,891 B2 8/2009 Klebanoff
(Continued)

FOREIGN PATENT DOCUMENTS

EP 2420966 A1 2/2012
WO 2001077959 A1 10/2001
(Continued)

OTHER PUBLICATIONS

PCT International Search Report and Written Opinion, Application No. PCTIUS2018/031980, dated Jul. 26, 2018, 11 pgs.
(Continued)

*Primary Examiner* — Scott C Anderson
(74) *Attorney, Agent, or Firm* — Armstrong Teasdale LLP

(57) ABSTRACT

A common point of purchase (CPP) system for identifying a common point of purchases involved in fraudulent or unauthorized payment transactions is provided. The CPP system includes a common point of purchase (CPP) computing device that is configured to receive transaction data, store the transaction data in a database, and perform a look up within the database. The CPP computing device is also configured to build a merchant table, receive a card list, and compare a plurality of flagged account identifiers in the card list to account identifiers in the merchant table. The CPP computing device is further configured to retrieve a unique merchant identifier and/or a merchant name identifier associated with the merchant table account identifiers matched with the flagged account identifiers, aggregate the unique merchant identifier using the merchant name identifier, and determine a first number of the flagged account identifiers associated with the merchant name identifier.

21 Claims, 7 Drawing Sheets

(51) Int. Cl.
  *G06Q 20/36* (2012.01)
  *G06F 16/951* (2019.01)
  *G06F 16/955* (2019.01)
  *G06F 16/22* (2019.01)
  *G06F 16/903* (2019.01)

(52) U.S. Cl.
  CPC .......... *G06F 16/951* (2019.01); *G06F 16/955* (2019.01); *G06Q 20/34* (2013.01); *G06Q 20/36* (2013.01); *G06Q 20/409* (2013.01)

(56) References Cited

U.S. PATENT DOCUMENTS

| | | | |
|---|---|---|---|
| 7,814,008 B2 | 10/2010 | Choudhuri et al. | |
| 8,266,059 B2 | 9/2012 | Horvath et al. | |
| 8,423,467 B1 | 4/2013 | Johansson et al. | |
| 8,489,476 B1 | 7/2013 | Lester | |
| 8,600,872 B1 | 12/2013 | Yan | |
| 8,606,700 B2 | 12/2013 | Carlson et al. | |
| 8,612,340 B1 | 12/2013 | Yan | |
| 8,620,801 B2 | 12/2013 | Choudhuri et al. | |
| 8,694,429 B1 | 4/2014 | Ballaro | |
| 8,706,641 B2 | 4/2014 | Bruesewitz et al. | |
| 8,744,958 B2 | 6/2014 | Carlson et al. | |
| 9,230,280 B1 | 1/2016 | Maag et al. | |
| 9,256,810 B2 | 2/2016 | Wu et al. | |
| 9,256,870 B1 | 2/2016 | Howe | |
| 9,331,994 B2 | 5/2016 | Grigg et al. | |
| 9,392,008 B1 | 7/2016 | Michel et al. | |
| 9,412,108 B2 | 8/2016 | Wang et al. | |
| 9,477,960 B2 | 10/2016 | Grigg et al. | |
| 9,483,766 B2 | 11/2016 | Grigg et al. | |
| 9,547,864 B2 | 1/2017 | Howe et al. | |
| 9,661,012 B2 | 5/2017 | Michel et al. | |
| 9,721,080 B2 | 8/2017 | Moran et al. | |
| 10,380,333 B1 | 8/2019 | Moran et al. | |
| 10,395,243 B1 | 8/2019 | Johansson et al. | |
| 2003/0217094 A1 | 11/2003 | Andrews | |
| 2004/0034604 A1 | 2/2004 | Klebanoff | |
| 2004/0162773 A1 | 8/2004 | Del Rey | |
| 2005/0055373 A1 | 3/2005 | Forman | |
| 2007/0185782 A1 | 8/2007 | Shooks | |
| 2009/0132404 A1 | 5/2009 | King et al. | |
| 2009/0276269 A1 | 11/2009 | Yee | |
| 2009/0307049 A1 | 12/2009 | Elliott, Jr. et al. | |
| 2010/0228580 A1 | 9/2010 | Zoldi et al. | |
| 2011/0078034 A1 | 3/2011 | Hayhow | |
| 2012/0084207 A1 | 4/2012 | Horvath et al. | |
| 2012/0239557 A1 | 9/2012 | Weinflash et al. | |
| 2012/0296824 A1 | 11/2012 | Rosano | |
| 2013/0036036 A1 | 2/2013 | Zoldi et al. | |
| 2013/0159077 A1 | 6/2013 | Stringfellow | |
| 2013/0231976 A1 | 9/2013 | Tavares et al. | |
| 2013/0297473 A1 | 11/2013 | Wolfe | |
| 2014/0032409 A1 | 1/2014 | Rosano | |
| 2014/0249934 A1 | 9/2014 | Subramanian et al. | |
| 2014/0258099 A1 | 9/2014 | Rosano | |
| 2014/0279331 A1 | 9/2014 | Gimby et al. | |
| 2014/0324522 A1* | 10/2014 | Wilkins | G06Q 30/0201 705/7.29 |
| 2014/0337215 A1 | 11/2014 | Howe | |
| 2015/0012430 A1 | 1/2015 | Chisholm et al. | |
| 2015/0073981 A1 | 3/2015 | Adjaoute | |
| 2015/0127547 A1 | 5/2015 | Powell et al. | |
| 2015/0220999 A1 | 8/2015 | Thornton et al. | |
| 2015/0339667 A1 | 11/2015 | Dua | |
| 2015/0339673 A1 | 11/2015 | Adjaoute | |
| 2015/0348023 A1 | 12/2015 | Fisher et al. | |
| 2015/0371207 A1 | 12/2015 | Cummins et al. | |
| 2016/0125317 A1 | 5/2016 | Benjamin | |
| 2016/0125405 A1 | 5/2016 | Alterman | |
| 2016/0155124 A1 | 6/2016 | Howe et al. | |
| 2016/0162759 A1 | 6/2016 | Yun et al. | |
| 2016/0171498 A1 | 6/2016 | Wang et al. | |
| 2016/0180333 A1 | 6/2016 | Leyva | |
| 2016/0196615 A1 | 7/2016 | Yen et al. | |
| 2016/0217470 A1* | 7/2016 | Gerard | G06Q 20/4016 |
| 2016/0335641 A1 | 11/2016 | White et al. | |
| 2016/0352766 A1 | 12/2016 | Flacher et al. | |
| 2016/0364727 A1* | 12/2016 | DeLawter | G06Q 20/4014 |
| 2016/0364728 A1 | 12/2016 | DeLawter | |
| 2017/0053294 A1 | 2/2017 | Yang et al. | |
| 2017/0116585 A1 | 4/2017 | Rosano | |
| 2017/0169500 A1 | 6/2017 | Merz et al. | |
| 2017/0193515 A1 | 7/2017 | Sharan et al. | |
| 2017/0293906 A1 | 10/2017 | Komarov | |
| 2018/0053188 A1 | 2/2018 | Zoldi et al. | |
| 2018/0114203 A1* | 4/2018 | Senci | G06Q 20/4016 |
| 2018/0218369 A1 | 8/2018 | Xiao et al. | |
| 2019/0073647 A1 | 3/2019 | Zoldi et al. | |
| 2019/0279309 A1 | 9/2019 | Gupta et al. | |

FOREIGN PATENT DOCUMENTS

| | | |
|---|---|---|
| WO | 0225495 A1 | 3/2002 |
| WO | 2009067346 A2 | 5/2009 |
| WO | 2012135115 A2 | 10/2012 |
| WO | 2017031039 A1 | 2/2017 |

OTHER PUBLICATIONS

PCT International Search Report and Written Opinion, Application No. PCT/US2013/059326, dated Mar. 7, 2019, 11 pps.

PCT International Search Report and Written Opinion, Application No. PCT/US2018/052143, dated Dec. 7, 2018, 12 pps.

* cited by examiner

```
                                                                    ┌─ 502
┌───────────────────────────────────────────────────────────────────┴───┐
│ RECEIVING TRANSACTION DATA ASSOCIATED WITH A PURCHASE INITIATED BY   │
│ A USER, THE TRANSACTION DATA INCLUDING A UNIQUE MERCHANT             │
│ IDENTIFIER, A TIME STAMP, A MERCHANT NAME IDENTIFIER, AND AN ACCOUNT │
│                            IDENTIFIER                                 │
└───────────────────────────────┬───────────────────────────────────────┘
                                │                    ┌─ 504
                                ▼                    │
        ┌────────────────────────────────────────────┴──┐
        │    STORING THE TRANSACTION DATA IN A DATABASE │
        └───────────────────────┬───────────────────────┘
                                │                    ┌─ 506
                                ▼                    │
┌───────────────────────────────────────────────────────┴───────────────┐
│ PERFORMING A LOOK UP WITHIN THE DATABASE INCLUDING PARSING THE        │
│ UNIQUE MERCHANT IDENTIFIER, THE TIME STAMP, THE MERCHANT NAME         │
│            IDENTIFIER, AND THE ACCOUNT IDENTIFIER                     │
└───────────────────────────────┬───────────────────────────────────────┘
                                │                    ┌─ 508
                                ▼                    │
┌───────────────────────────────────────────────────────┴───────────────┐
│ BUILDING A MERCHANT TABLE INCLUDING A MERCHANT PROFILE USING THE      │
│ UNIQUE MERCHANT IDENTIFIER, THE TIME STAMP, THE MERCHANT NAME         │
│            IDENTIFIER, AND THE ACCOUNT IDENTIFIER                     │
└───────────────────────────────┬───────────────────────────────────────┘
                                │                    ┌─ 510
                                ▼                    │
┌───────────────────────────────────────────────────────┴───────────────┐
│ RECEIVING A CARD LIST FROM A THIRD PARTY, THE CARD LIST INCLUDING     │
│           A PLURALITY OF FLAGGED ACCOUNT IDENTIFIERS                  │
└───────────────────────────────┬───────────────────────────────────────┘
                                │                    ┌─ 512
                                ▼                    │
┌───────────────────────────────────────────────────────┴───────────────┐
│ COMPARING THE PLURALITY OF FLAGGED ACCOUNT IDENTIFIERS TO THE         │
│          ACCOUNT IDENTIFIERS IN THE MERCHANT TABLE                    │
└───────────────────────────────┬───────────────────────────────────────┘
                                │                    ┌─ 514
                                ▼                    │
┌───────────────────────────────────────────────────────┴───────────────┐
│ RETRIEVING AT LEAST ONE OF THE UNIQUE MERCHANT IDENTIFIER AND THE     │
│ MERCHANT NAME IDENTIFIER ASSOCIATED WITH THE MERCHANT TABLE           │
│ ACCOUNT IDENTIFIERS MATCHED WITH THE FLAGGED ACCOUNT IDENTIFIERS      │
└───────────────────────────────┬───────────────────────────────────────┘
                                │                    ┌─ 516
                                ▼                    │
┌───────────────────────────────────────────────────────┴───────────────┐
│ AGGREGATING THE AT LEAST ONE OF THE UNIQUE MERCHANT IDENTIFIER        │
│              USING THE MERCHANT NAME IDENTIFIER                       │
└───────────────────────────────┬───────────────────────────────────────┘
                                │                    ┌─ 518
                                ▼                    │
┌───────────────────────────────────────────────────────┴───────────────┐
│ DETERMINING A FIRST NUMBER OF THE FLAGGED ACCOUNT IDENTIFIERS         │
│          ASSOCIATED WITH THE MERCHANT NAME IDENTIFIER                 │
└───────────────────────────────────────────────────────────────────────┘
```

FIG. 5

SYSTEMS AND METHODS FOR IDENTIFYING FRAUDULENT COMMON POINT OF PURCHASES

BACKGROUND

This disclosure relates generally to identifying a common point of purchases associated with fraudulent or unauthorized payment transactions and, more particularly, to systems and methods for identifying a common point of purchases involved in fraudulent or unauthorized payment transactions based upon payment card lists and transaction data.

Many merchants store payment card information, including payment card account numbers, for their returning customers, to process returns, and/or for purchase trend research. This payment card information may include other cardholder identifying information. In many cases, this information is stored for processing recurring transactions or to improve the speed of the checkout process for future online transactions. The stored payment card information allows a customer to avoid having to re-enter his or her payment card information every time the customer makes an online purchase from the merchant. However, the stored payment card information has the potential to be stolen. Over the past several years, many cases of security breaches, also known as account data compromise (ADC) events, or "hacks," have been reported. The stolen payment card information may then be used to perform fraudulent transactions.

While some breaches involve only a few payment cards at a time, some large-scale ADC events have become endemic, and involve the compromise of tens of millions of primary account numbers (PAN) of active payment accounts annually. In many cases, these compromised accounts are exposed in public places (e.g., the Internet) or are detected by law enforcement efforts. Large-scale ADC events, however, can be very costly and time-consuming for a payment card issuer, for example, in providing a new PAN and/or a physical card for every compromised cardholder account. That is, the cardholder account, which is a line of credit issued by the issuer (e.g., a bank), does not typically change except with regard to size (dollar amount) and duration. The PAN, on the other hand, represents the number on a payment card for identifying the cardholder account, and may change numerous times for the same cardholder account. An issuing bank, for example, must typically spend time and money each time it replaces a PAN and/or issues a new physical payment card with that PAN.

For large-scale ADC events, existing fraud detection systems take focus on identifying the source of a data breach, but are unable to identify in a timely fashion the merchants and accounts that may be compromised and/or breached. Accordingly, a system is needed that is configured to provide early warnings of at-risk merchants and accounts before the merchants and accounts are subject to significant fraud or theft.

BRIEF DESCRIPTION

In one aspect, a common point of purchase (CPP) system for identifying a common point of purchases involved in fraudulent or unauthorized payment transactions is provided. The CPP system includes at least one common point of purchase (CPP) computing device that includes a processor communicatively coupled to a memory and is configured to receive transaction data associated with a purchase initiated by a user, the transaction data including a unique merchant identifier, a time stamp, a merchant name identifier, and an account identifier. The CPP computing device is also configured to store the transaction data in a database, perform a look up within the database including parsing the unique merchant identifier, the time stamp, the merchant name identifier, and the account identifier, and build a merchant table including a merchant profile using the unique merchant identifier, the time stamp, the merchant name identifier, and the account identifier. The CPP computing device is further configured to receive a card list from a third party including a plurality of flagged account identifiers, compare the plurality of flagged account identifiers to the account identifiers in the merchant table, and retrieve at least one of the unique merchant identifier and the merchant name identifier associated with the merchant table account identifiers matched with the flagged account identifiers. The CPP computing device is also configured to aggregate the at least one of the unique merchant identifier using the merchant name identifier, and determine a first number of the flagged account identifiers associated with the merchant name identifier.

In another aspect, a computer-implemented method for identifying a common point of purchases involved in fraudulent or unauthorized payment transactions. is provided. The method is performed using a common point of purchase (CPP) computing device that includes at least one processor in communication with at least one memory device. The method includes receiving transaction data associated with a purchase initiated by a user, the transaction data including a unique merchant identifier, a time stamp, a merchant name identifier, and an account identifier. The method also includes storing the transaction data in a database, performing a look up within the database including parsing the unique merchant identifier, the time stamp, the merchant name identifier, and the account identifier, and building a merchant table including a merchant profile using the unique merchant identifier, the time stamp, the merchant name identifier, and the account identifier. The method further includes receiving a card list from a third party including a plurality of flagged account identifiers, comparing the plurality of flagged account identifiers to the account identifiers in the merchant table, and retrieving at least one of the unique merchant identifier and the merchant name identifier associated with the merchant table account identifiers matched with the flagged account identifiers. The method also includes aggregating the at least one of the unique merchant identifier using the merchant name identifier, and determining a first number of the flagged account identifiers associated with the merchant name identifier.

In yet another aspect, a non-transitory computer readable medium that includes executable instructions for identifying a common point of purchases involved in fraudulent or unauthorized payment transactions is provided. When the computer executable instructions are executed by a common point of purchase (CPP) computing device that includes at least one processor in communication with at least one memory device, the computer executable instructions cause the CPP computing device to receive transaction data associated with a purchase initiated by a user, the transaction data including a unique merchant identifier, a time stamp, a merchant name identifier, and an account identifier. The computer executable instructions also cause the CPP computing device to store the transaction data in a database, perform a look up within the database including parsing the unique merchant identifier, the time stamp, the merchant name identifier, and the account identifier, and build a merchant table including a merchant profile using the unique merchant identifier, the time stamp, the merchant name identifier, and the account identifier. The computer executable instructions further cause the CPP computing device to receive a card list from a third party including a plurality of flagged account identifiers, compare the plurality of flagged account identifiers to the account identifiers in the merchant table, and retrieve at least one of the unique merchant identifier and the merchant name identifier associated with the merchant table account identifiers matched with the flagged account identifiers. The computer executable instructions also cause the CPP computing device to aggregate the at least one of the unique merchant identifier using the merchant name identifier, and determine a first number of the flagged account identifiers associated with the merchant name identifier.

BRIEF DESCRIPTION OF THE DRAWINGS

FIGS. 1-7 show example embodiments of the systems and methods described herein.

FIG. 1 is a schematic diagram illustrating an example multi-party payment processing system for enabling payment-by-card transactions.

FIG. 2 is a simplified block diagram of an example system used for identifying a common point of purchases involved in fraudulent or unauthorized payment transactions in accordance with an example embodiment of the present disclosure.

FIG. 3 illustrates an example configuration of a client system shown in FIG. 2, in accordance with an embodiment of the present disclosure.

FIG. 4 illustrates an example configuration of the server system shown in FIG. 2, in accordance with an embodiment of the present disclosure.

FIG. 5 is a flowchart illustrating an example process for identifying a common point of purchases involved in fraudulent or unauthorized payment transactions, which may be implemented utilizing the system shown in FIG. 2.

FIG. 6 illustrates an example configuration of a common point of purchase (CPP) computing device, in accordance with one embodiment of the present disclosure.

FIG. 7 shows a diagram of components of an example computing device that may be used in the system shown in FIG. 2 to facilitate electronic purchases using wireless communication systems.

DETAILED DESCRIPTION

Figure 1:
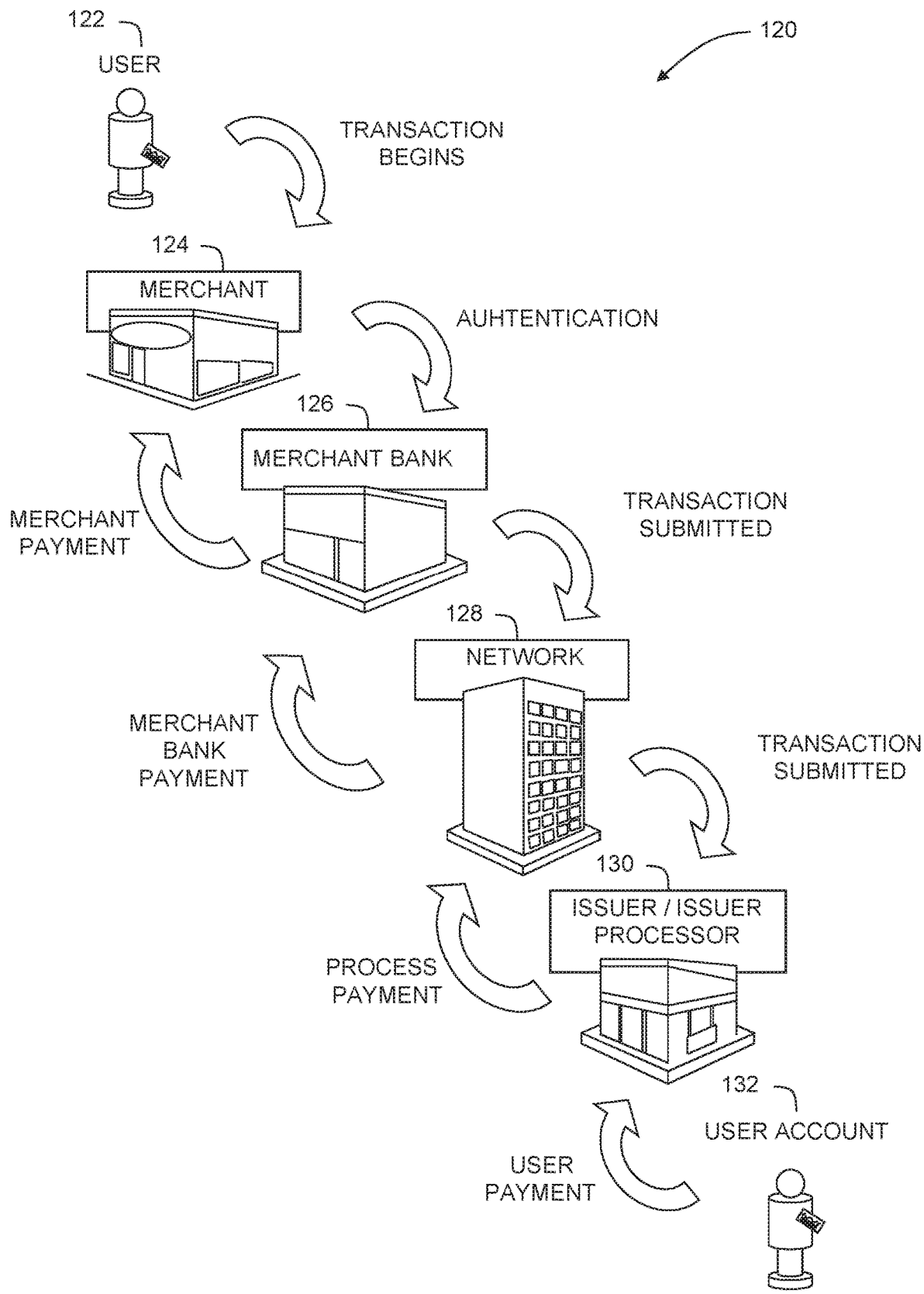

The following detailed description illustrates embodiments of the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure. The disclosure is described as applied to an example embodiment, namely, methods and systems utilizing a common point of purchase (CPP) system for identifying merchants associated with primary account numbers (PANs) that may be compromised. The CPP system described herein includes at least one common point of purchase (CPP) computing device that generates one or more metrics for identifying merchants associated with compromised PANs. The CPP computing device may be in communication with at least one merchant computing device (e.g., a point-of-sale (POS) terminal), a payment processor, and at least one third party provider of PANs which fraud has been reported and/or PANs deemed to be merely compromised. The third party providers may include law enforcements, fraud detector institutions, financial institutions, or any other institutions able to provide PANs involved in fraudulent activity and/or compromised PANs.

The CPP computing device includes a processor in communication with a memory. The CPP computing device is further in communication with at least one database for storing information, such as transaction data. The transaction data may include one or more payment transactions initiated by a user using a payment device (e.g., a payment card, digital wallet, mobile payment, etc.) associated with a particular transaction processing network. The transaction data may also include, among other data points, data associated with the user and the merchant involved in the payment transaction. For example, transaction data may include one or more of: a user account data (e.g., PAN), user biometric data, a merchant identifier, a merchant computing device identifier, a transaction amount, a time and date of the transaction, data descriptive of the purchase, a location of the transaction, and/or other data associated with the payment transaction. In the example embodiment, as some of the information stored in the database may include personally identifiable information (PII), any stored PII is encrypted to prevent unauthorized access to the PII. Moreover, in any embodiments in which PII may be collected, the user from which the PII may be collected is provided an opportunity to agree to or deny collection of such data.

In the example embodiment, the CPP computing device utilizes the merchant identifiers and the PANs to generate the one or more metrics for identifying merchants associated with compromised PANs. In some embodiments, the CPP computing device is configured to build a merchant table that includes merchant data. The merchant data may be a combination of transaction times (e.g., time stamps), PANs, merchant name identifiers, and unique merchant identifiers. For example, the CPP computing device may receive transaction data including the same PAN and the same merchant (e.g., grocery store A), but from different locations of the merchant (e.g., grocery store A at location X and grocery store A at location Y). Even though the merchant is the same (e.g., grocery store A), the merchant identifier may be different for each location (e.g., grocery store A at location X has different merchant identifier than grocery store at location Y). In the example embodiment, the different merchant identifiers associated with the same merchant (e.g., merchant name identifier) may also be referred to as merchant unique identifiers. The CPP computing device parses the transaction data associated with each PAN in order to identify each merchant identifier associated with each PAN.

The CPP computing device is further configured to identify and retrieve each unique merchant identifier and transmit each unique merchant identifier to the merchant table using the PAN associated with each unique merchant identifier. The CPP computing device is also configured to receive PANs (e.g., a list of PANs) where fraud has been reported and/or PANs deemed to be merely compromised from one or more third parties. The CPP computing device is further configured to generate a card list (e.g., a payment card list) using the PANs involved in fraudulent activity and/or the compromised PANs. The CPP computing device is also configured to compare the PANs in the merchant table to the PANs in the card list. If the PANs in the merchant table match the PANs in the card list, the CPP computing device retrieves, from the merchant table, the unique merchant identifiers associated with the matched PANs. The CPP computing device is further configured to retrieve one or more metrics to determine whether one or more of the retrieved merchants have been breached during a time period.

In one embodiment, one of the retrieved metrics includes computing a percentage of PANs in the card list that were used at a merchant more than one time. The CPP computing device may compute the percentage by unique merchant identifier and/or an aggregate of unique merchant identifiers (also referred to as cleansed merchant name). The CPP computing device may generate the aggregate of unique merchant identifiers by parsing the merchant table and performing a look up for unique merchant identifiers with the same merchant name (e.g., merchant name identifier).

For example, franchise restaurant C has multiple locations and each location has its own unique merchant identifier. The CPP computing device parses the merchant table and performs a look up for restaurant C. Once the CPP computing device has found all the restaurant Cs included in the merchant table, the CPP computing device retrieves all the found restaurant Cs, aggregates them, collapse them, and places them as a single location (e.g., string) in a file list. Thus, all the restaurant Cs transactions are added for each PAN. That is, if a user initiated transactions with the same PAN at multiple locations of restaurant C, the CPP computing device is configured to determine the total number of transactions for the PAN in all restaurant C locations. For example, if the user used the same PAN one time at restaurant C at location A, four times at location B, and three times at location D, the CPP computing device is able to determine that the PAN was used eight times at restaurant C.

In certain embodiments, the CPP computing device may compute the percentage by unique merchant identifier by adding the number of PANs associated with each retrieved unique merchant identifier and dividing the added number of PANs to the total number of PANs in the card list. For example, the CPP computing device may determine that thirty-eight percent of PANs in the card list were used in store A at location B, twenty-two percent of the PANs were used in store A at location C, twenty-seven percent of the PANs were used in store D at location E, and thirteen percent of the PANs were used in store D at location F. In some embodiments, the CPP computing device may compute the percentage by aggregate merchant identifier by adding the number of PANs associated with each aggregate merchant identifier and dividing the added number of PANs to the total number of PANs in the card list. Continuing with the example above, but this time referring to the aggregate merchant identifier percentage, the CPP computing device may determine that sixty percent of the PANs were used in store A and forty percent were used in store D.

The percentage metric enables the CPP computing device to identify merchants that may have been breached. For example, if the percentage of PANs associated with the merchant is one hundred percent or a number relatively close to one hundred percent, the CPP computing device flags the merchant as being breached. When the CPP computing device computes the percentage by unique merchant identifier, the CPP computing device may identify which particular location associated with a merchant has been breached. In some embodiments, the CPP computing device is configured to compute the percentage by the aggregate merchant identifier in order to identify a merchant that has been breached. Once the CPP computing device identifies the breached merchant, the CPP computing device computes the percentage by unique merchant identifier in order to identify the locations associated with the merchant that have been breached the most.

In another embodiment, one of the retrieved metrics includes computing a partial chi-square test of the unique merchant identifiers and/or cleansed merchant names. The CPP computing device is configured to compute the partial chi-square test to compare merchants against each other based on how unexpected the number of PANs in the card list are associated with a merchant. For example, the CPP computing device may receive 500,000 PANs involved in fraudulent activity and/or compromised PANs during a year. The CPP computing device then generates a card list using these PANs, compares and matches the PANs in the card list to the PANs in the merchant table received during the year, and retrieves the merchants associated with the PANs. In this example, one of the merchants is a gas station. The CPP computing device aggregates the number of PANs associated with the gas station and determines that 20,000 of the 500,000 of the matched PANs are associated with the gas station. The CPP computing device parses the merchant table, using the unique merchant identifier corresponding to the gas station, to aggregate the PANs associated with the gas station and determine the total number of PANs associated with the gas station that were received during the year. In this case, the CPP computing device determines that 40,000 PANs were received during the year. Thus, 20,000 out of 40,000 PANs are suspicious. The CPP computing device then parses the merchant table to determine the total number of PANs received for all merchants during the year. In this example, the CPP computing device determines that 400 million PANs were received. Subsequently, the CPP computing device computes the partial chi-square test as follows:

$$\frac{\text{Total \# of } PANs \text{ for Merchant} \times \text{Total \# of } PANs \text{ in Card List}}{\text{Total \# of } PANs \text{ Received}} = X$$

In this example the CPP computing device computes the following:

$$\frac{40,000 \times 500,000}{400,000,000} = 50$$

$$\frac{(20,0000 \times 50)^2}{50} = 7,960,050$$

In the example embodiment, a large partial chi-square represents that the number of PANs in the card list is more than normally should be, and thus the merchant associated with the PANs may have been breached. In this example, the partial chi-square is 7,960,050 which is a large number. Therefore, the CPP computing device flags the gas station as a merchant that potentially has been breached. The CPP computing device is configured to use the partial chi-square number to rank merchants against each other. That, is the CPP computing device compares the partial chi-square of merchants against each other to determine which merchants are more likely to have been breached. The larger the difference between the partial chi-squares, the more suspicious (e.g., the merchant that is more likely to have been breached) one merchant is over another. For example, if merchant A gets a chi-square of 10,000 and B gets a chi-square of 100,000, and C gets a chi-square of 14,000, the CPP computing device may determine that merchant B is the most suspicious merchant and flags the merchant B as potentially breached (e.g., referred for fraud investigation).

The CPP computing device is further configured to generate and transmit a report of merchants that are flagged as being breached. The CPP computing device may also sort the report to display, for example, the merchants that are more likely to have been breached first. The CPP computing device may determine a merchant is more likely to have been breached than another merchant by aggregating the number of PANs in the Card Lit associated with each merchant. For example, the CPP computing device may determine that merchant A is more likely to have been breached than merchant B because after the CPP computing device aggregated the PANs associated with each merchant, merchant A was associated with more PANs than merchant B.

The methods and systems described herein may be implemented using computer programming or engineering techniques including computer software, firmware, hardware, or any combination or subset thereof. As disclosed above, at least one technical problem with prior payment processing systems is that the systems retroactively respond to ADC events after fraudulent transactions have been performed, typically focusing on the source of a data breach. The systems and methods described herein address this technical problem by proactively identifying merchants that are at-risk by comparing them against a card list, and then computing metrics that identify the merchants that might have been breached. A payment card issuer, such as a bank, may then more efficiently address at-risk PANs associated with the identified merchants, thereby significantly reducing the time and resources required to respond to large-scale ADC events.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer readable medium and utilizes a Structured Query Language (SQL) with a client user interface front-end for administration and a web interface for standard user input and reports. In another embodiment, the system is web enabled and is run on a business-entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.).

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party payment processing system 120 for enabling payment-by-card transactions. Embodiments described herein may relate to a transaction card system, such as a credit card payment system using the Mastercard® interchange network. The Mastercard® interchange network is a set of proprietary communications standards promulgated by Mastercard International Incorporated® for the exchange of financial transaction data and the settlement of funds between financial institutions that are members of Mastercard International Incorporated®. (Mastercard is a registered trademark of Mastercard International Incorporated located in Purchase, N.Y.).

As described with respect to payment processing system 120, a financial institution called the "issuer" issues a transaction card or electronic payments account identifier, such as a credit card or debit card, to a consumer, cardholder, or user 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When user 122 tenders payment for a purchase with a transaction card, merchant 124 requests authorization from a merchant bank 126 for the amount of the purchase. The request may be performed over the telephone, but is usually performed through the use of a point-of-sale (POS) terminal, which reads user's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the POS terminal will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether user's account 132 associated with user 122 is in good standing and whether the purchase is covered by user's account 132 available credit line. Based on these determinations, the request for authorization will be declined or accepted. If the request is accepted, an authorization code is issued to merchant 124.

When a request for authorization is accepted, the available credit line of user's account 132 is decreased. Normally, a charge for a payment card transaction is not posted immediately to user's account 132 because bankcard associations, such as Mastercard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If user 122 cancels a transaction before it is captured, a "void" is generated. If user 122 returns goods after the transaction has been captured, a "credit" is generated. Interchange network 128 and/or issuer bank 130 stores the transaction card information, such as a category of merchant, a merchant identifier, a location where the transaction was completed, amount of purchase, and date and time of the transaction in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction.

For debit card transactions, when a request for a personal identification number (PIN) authorization is approved by the issuer, user's account 132 is decreased. Normally, a charge is posted immediately to user's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant bank 126, issuer bank 130, and merchant's 124 account related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

In some embodiments, user 122 registers one or more payment cards with a digital wallet. Having done this, user 122 can interact with a participating online merchant 124. At the check-out stage, online merchant 124 displays a button on the merchant website which user 122 can click on in order to make a payment using the user's 122 digital wallet. Online merchant 124 then redirects user 122 to a "switch" operated by interchange network 128. Using a cookie located on the user's computer, the "switch" is able to determine which wallet-hosting server hosts a wallet associated with user 122. The switch then establishes a connection between the user's computer and the appropriate wallet-hosting system, which presents user 122 with a sign-in page (e.g., as a pop-up window), where there is an authentication process (e.g., entry of a pre-agreed password). This log-in process may use the same login credentials (e.g., password) which user 122 also uses to obtain access to other online banking activities.

The wallet-hosting system then securely transfers user's 122 payment information to the online merchant's domain. The merchant's domain submits user's 122 payment information to merchant bank 126 for a separate authorization process in which the acquiring domain communicates with the issuer bank 130 to ask the bank to authorize the transaction. Thus, user 122 is not required to enter their card details (except at the stage of initially registering with the wallet-hosting system), and the online transaction process is streamlined with only a single redirection, and consistent branding for the entire payment process, irrespective of the online merchant 124.

In some embodiments, a unique identifier is provided to user 122. The unique identifier is different from the number associated with user's account 132. In these embodiments, interchange network 128 stores the unique identifier in database 220 along with user's account 132. When interchange network 128 receives the unique identifier, interchange network 128 determines the associated user's account 132 and uses that information in processing the payment transaction.

Figure 2:
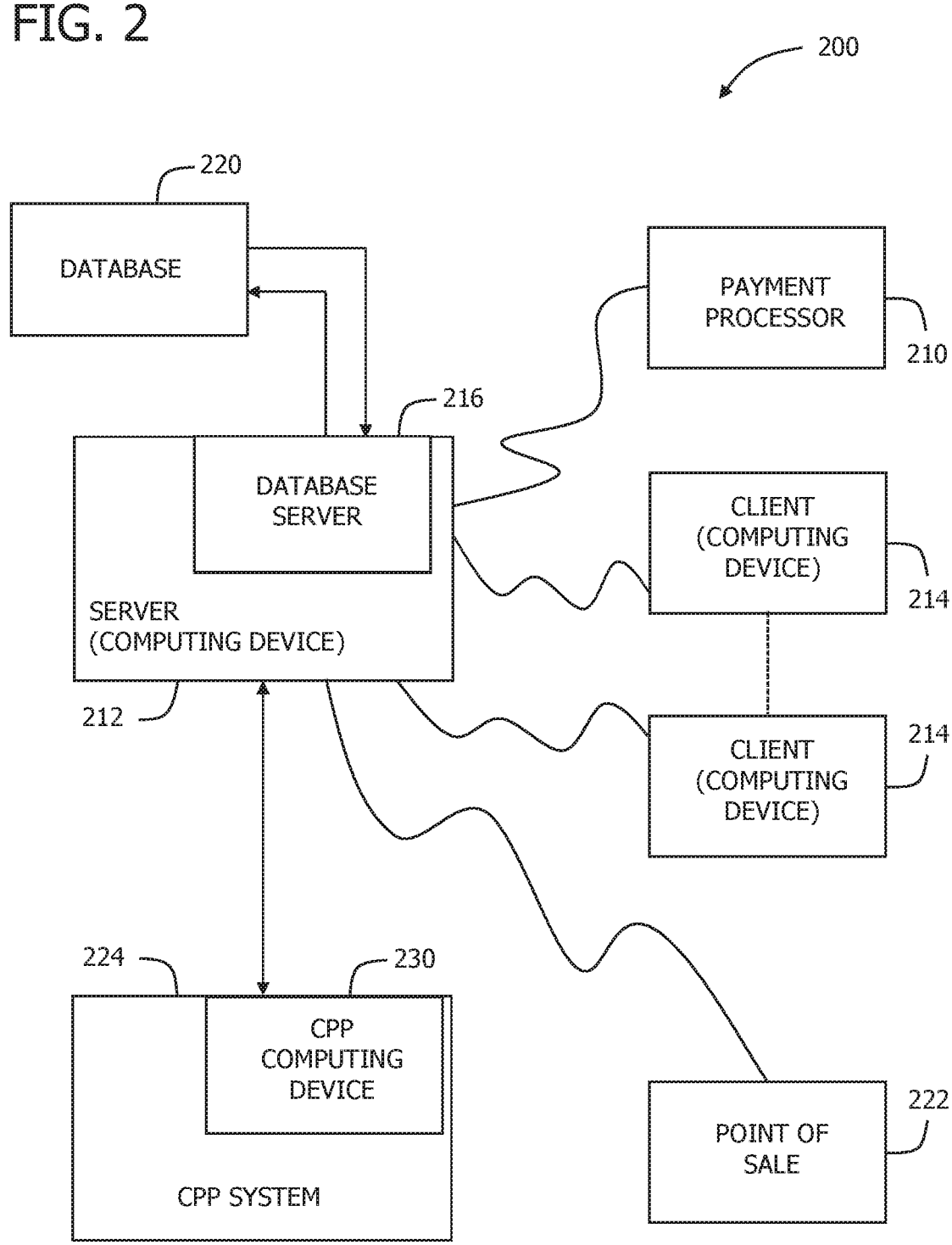

FIG. 2 is a simplified block diagram of an example system 200 used for identifying a common point of purchases involved in fraudulent or unauthorized payment transactions in accordance with one example embodiment of the present disclosure. System 200 may be implemented in the performance of payment-by-card transactions received as part of processing user transactions. In an example embodiment, system 200 is a payment processing system that includes a common point of purchase (CPP) system 224 configured to identify merchants and primary account numbers (PANs) that have been compromised or are at risk of being compromised.

In the example embodiment, system 200 includes a server system 212 and client computing devices 214 (also referred to as client systems 214). In some embodiments, client systems 214 include computers configured to implement a web browser or a software application, which enables client systems 214 to access server system 212 using the Internet. Client systems 214 may be communicatively coupled to the Internet through many interfaces including, but not limited to, at least one of a network, such as the Internet, a local area network (LAN), a wide area network (WAN), or an integrated services digital network (ISDN), a dial-up-connection, a digital subscriber line (DSL), a cellular phone connection, and a cable modem. Alternatively, client systems 214 include any device capable of accessing the Internet including, but not limited to, a desktop computer, a laptop computer, a personal digital assistant (PDA), a cellular phone, a smartphone, a tablet, a phablet, or other web-based connectable equipment. In the example embodiment, client systems 214 may be computing devices associated with one of user 122, merchant 124, merchant bank 126, and/or issuer bank 130, as illustrated in FIG. 1. Client system 214 may also be associated with third parties (not shown).

In one embodiment, server system 212 includes a database server 216 that is communicatively coupled to a database 220 for storing data. In an exemplary embodiment, database 220 stores transaction information from a plurality of users and paths based on the individual transactions. According to the exemplary embodiment, database 220 is disposed remotely from server system 212. In other embodiments, database 220 is decentralized, or may be a portion of server system 212. In the exemplary embodiment, a user (not shown) is able to access database 220 through client systems 214 by logging onto server system 212. In the example embodiment, server system 212 may be associated with payment processor 210.

System 200 further includes one or more point-of-sale (POS) systems 222 that are communicatively coupled with the server system 212. POS systems 222 may be, for example, merchants 124, and are communicatively coupled with server system 212 through payment processing system 120. POS systems 222 may include, without limitation, machines that accept card swipes, online payment portals, digital wallet payments, or stored payment card numbers for recurring transactions.

In the example embodiment, server system 212 is associated with a financial transaction interchange network, such as interchange network 128 shown in FIG. 1, and is also referred to as an interchange computer system. In some embodiments, server system 212 is used for processing transaction data and analyzing for fraudulent transactions. In one embodiment, at least one of client systems 214 includes a computer system associated with an issuer of a transaction payment card. Accordingly, server system 212 and client systems 214 may be utilized to process transaction data relating to purchases user 122 makes utilizing a transaction card processed by interchange network 128 and issued by the associated issuer bank 130. In the exemplary embodiment, at least one client system 214 may be associated with user 122 seeking to register, access information, or process a transaction with at least one of interchange network 128, issuer bank 130, or merchant 124. In addition, client systems 214 or POS systems 222 may include individual point-of-sale (POS) terminals (not shown) associated with merchant 124 and used for processing payment transactions. In an alternative embodiment, at least one client system 214 is utilized for investigating potential breaches.

In the example embodiment, CPP system 224 is communicatively coupled with server system 212. CPP system 224 can access server system 212 to store and access data and to communicate with the client systems 214 through server system 212. In some embodiments, CPP system 224 may be associated with or part of payment processor 210, or in communication with payment processing system 120, shown in FIG. 1. In other embodiments, CPP system 224 is associated with the third parties and is in electronic communication with the payment processing system 120. In some embodiments, CPP system 224 may be associated with, or be part of merchant bank 126, interchange network 128, and issuer bank 130.

In an example embodiment, CPP system 224 includes at least one CPP computing device 230 that is communicatively coupled to the third parties (e.g., either directly or indirectly) and configured to receive PANs which fraud has been reported and/or PANs deemed to be merely compromised from the third parties. CPP computing device 230 may then generate a card list using the PANs involved in fraudulent activity and/or the compromised PANs. In the example embodiment, CPP computing device 230 further compares the PANs in a merchant table to the PANs in the card list. If the PANs in the merchant table match the PANs in the card list, CPP computing device 230 retrieves, from the merchant table, the unique merchant identifiers associated with the matched PANs. CPP computing device 230 may also retrieve one or more metrics to determine whether one or more of the retrieved merchants have been breached during a time period.

Figure 3:
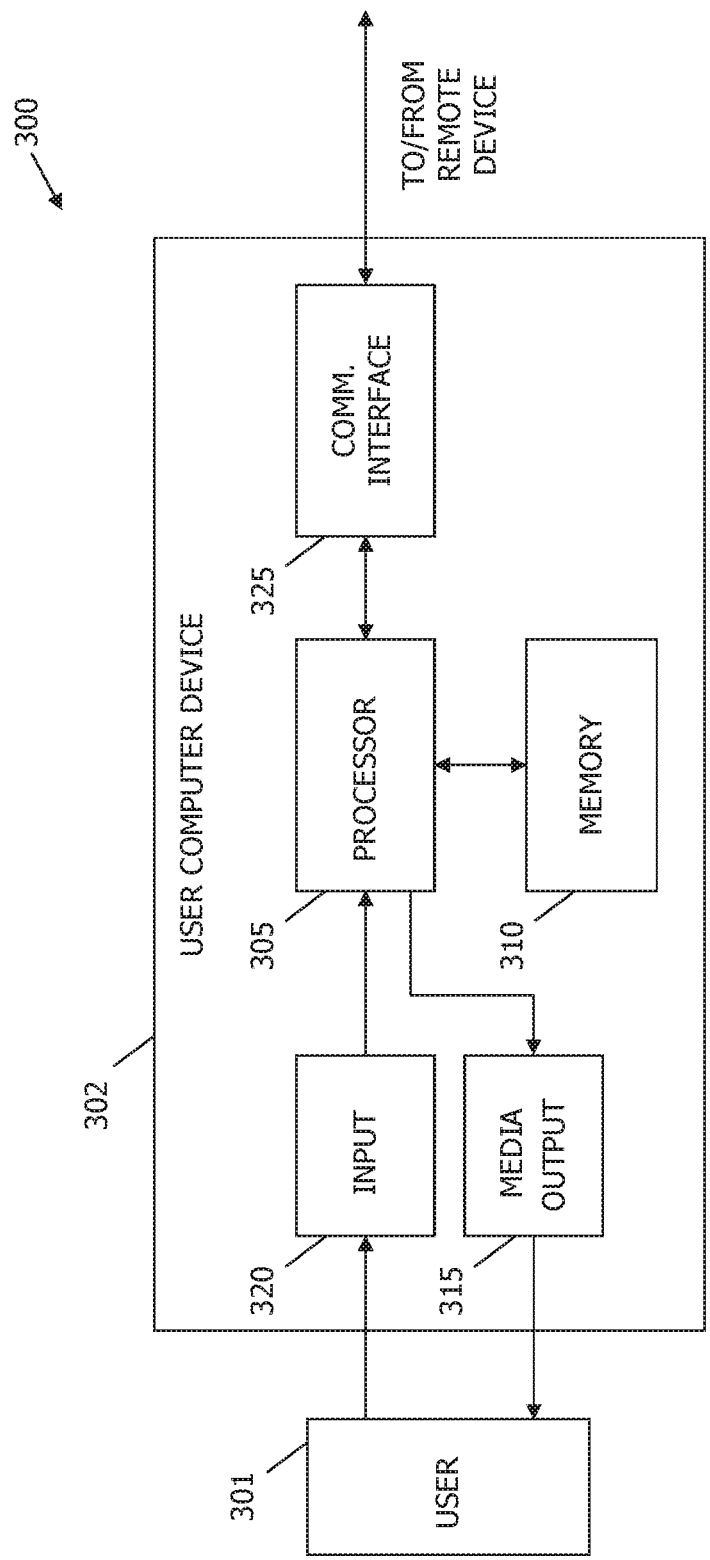

FIG. 3 illustrates an example configuration of a client system 300 in accordance with one embodiment of the present disclosure. In the example embodiment, client system 300 includes at least one user computing device 302, operated by a user 301. User 301 may include, but is not limited to, user 122 (shown in FIG. 1). User computer device 302 may include, but is not limited to, one or more of client systems 214 and CPP computing device 230 (both shown in FIG. 2). User computer device 302 includes a processor 305 for executing instructions, and a memory area 310. In some embodiments, executable instructions are stored in memory area 310. Processor 305 may, for example, include one or more processing units (e.g., in a multi-core configuration). Memory area 310 may, for example, be any device allowing information such as executable instructions and/or transaction data to be stored and retrieved. Memory area 310 may further include one or more computer readable media.

In the example embodiment, user computer device 302 further includes at least one media output component 315 for presenting information to user 301. Media output component 315 may, for example, be any component capable of converting and conveying electronic information to user 301. For example, media output component 315 may be a display component configured to display component lifecycle data in the form of reports, dashboards, communications, and the like In some embodiments, media output component 315 includes an output adapter (not shown), such as a video adapter and/or an audio adapter, which is operatively coupled to processor 305 and operatively connectable to an output device (also not shown), such as a display device (e.g., a cathode ray tube (CRT), liquid crystal display (LCD), light emitting diode (LED) display, or "electronic ink" display) or an audio output device (e.g., a speaker or headphones).

In some embodiments, media output component 315 is configured to include and present a graphical user interface (not shown), such as a web browser and/or a client application, to user 301. The graphical user interface may include, for example, an online store interface for viewing and/or purchasing items, and/or a wallet application for managing payment information. In some embodiments, user computer device 302 includes an input device 320 for receiving input from user 301. User 301 may use input device 320 to, without limitation, select and/or enter one or more items to purchase and/or a purchase request, or to access credential information, and/or payment information. Input device 320 may include, for example, a keyboard, a pointing device, a mouse, a stylus, a touch sensitive panel, a touch pad, a touch screen, a gyroscope, an accelerometer, a position detector, an audio input device, a fingerprint reader/scanner, a palm print reader/scanner, a iris reader/scanner, a retina reader/scanner, a profile scanner, or the like. A single component such as a touch screen may function as both an output device of media output component 315 and input device 320. User computing device 302 may also include a communication interface 325, which is communicatively connectable to a remote device such as server system 212 (shown in FIG. 2). Communication interface 325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in memory area 310 are, for example, computer readable instructions for providing a user interface to user 301 via media output component 315 and, optionally, receiving and processing input from input device 320. A user interface may include, among other possibilities, a web browser, and client application. Web browsers enable users, such as user 301, to display and interact with media and other information typically embedded on a web page or a website from server system 212. A client application allows user 301 to interact with a server application from server system 212. For example, instructions may be stored by a cloud service, and the output of the execution of the instructions sent to the media output component 315.

Figure 6:
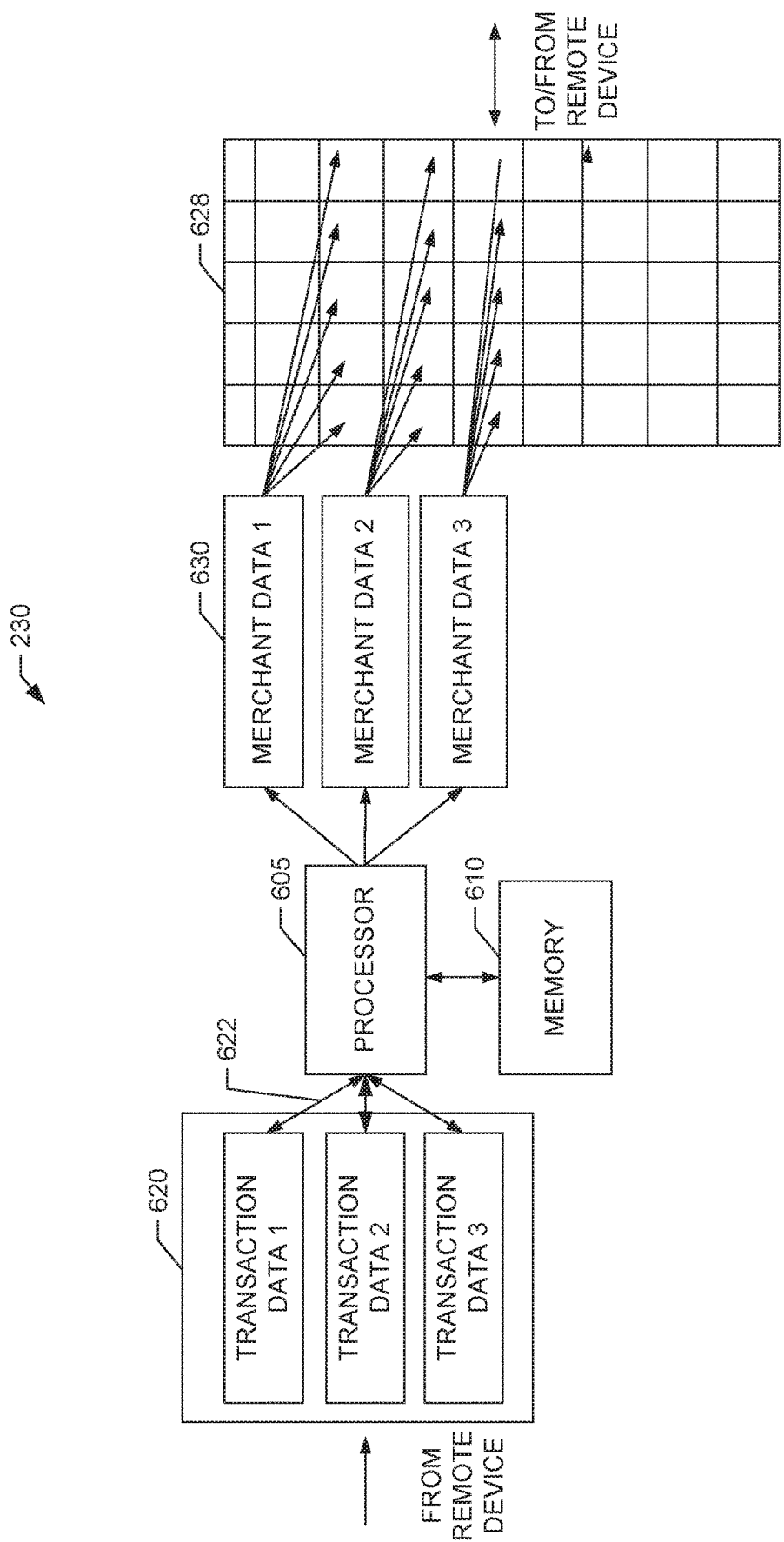

Processor 305 executes computer-executable instructions for implementing aspects of the disclosure. In some embodiments, the processor 305 is transformed into a special purpose microprocessor by executing computer-executable instructions or by otherwise being programmed. For example, the processor 305 may be programmed with instructions such that it may execute the processes as illustrated in FIGS. 5 and 6, below.

Figure 4:
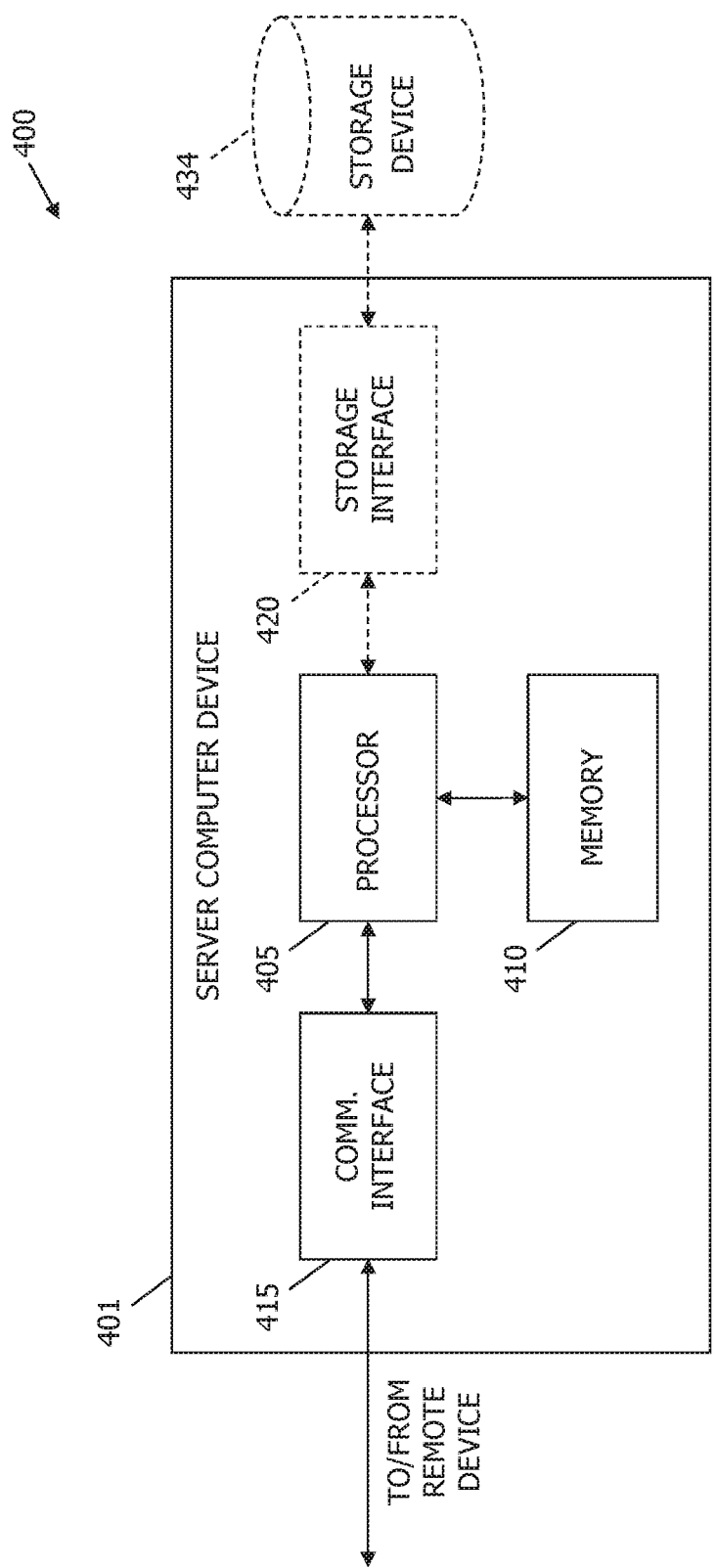

FIG. 4 illustrates an example configuration of a server system 400, such as server system 212 and/or CPP system 224 (shown in FIG. 2). In the example embodiment, server system 400 includes at least one server computing device 401, in electronic communication with at least one storage device 434. Server computing device 401 may include, but is not limited to, database server 216 (shown in FIG. 2). In the exemplary embodiment, server computing device 401 includes a processor 405 for executing instructions (not shown) stored in a memory area 410. In an embodiment, processor 405 may include one or more processing units (e.g., in a multi-core configuration) for executing instructions. The instructions may be executed within various different operating systems on the server system 400, such as UNIX®, LINUX® (LINUX is a registered trademark of Linus Torvalds), Microsoft Windows®, etc. More specifically, the instructions may cause various data manipulations on data stored in storage device 434 (e.g., create, read, update, and delete procedures. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

In the example embodiment, processor 405 is operatively coupled to a communication interface 415 such that server system 400 is capable of communicating with a remote device such as a user system or another server system 400. For example, communication interface 415 may receive requests from client system 300 (FIG. 3) via the Internet, within the scope of the embodiment illustrated in FIG. 4.

In the example embodiment, processor 405 is also operatively coupled to a storage device 434, which may be, for example, any computer-operated hardware unit suitable for storing and/or retrieving data. In some embodiments, storage device 434 is integrated in server system 400. For example, server system 400 may include one or more hard disk drives as storage device 434. In certain embodiments, storage device 434 is external to server system 400 and is similar to database 220 (shown in FIG. 2). For example, server system 400 may include one or more hard disk drives as storage device 434. In other embodiments, storage device 434 is external to server system 400 and may be accessed by a plurality of server systems 400. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 may include, for example, a component capable of providing processor 405 with access to storage device 434. In an exemplary embodiment, storage interface 420 further includes one or more of an Advanced Technology Attachment (ATA) adapter, a Serial ATA (SATA) adapter, a Small Computer System Interface (SCSI) adapter, a RAID controller, a SAN adapter, a network adapter, and/or any similarly capable component providing processor 405 with access to storage device 434.

Memory area 410 may include, but is not limited to, random-access memory (RAM) such as dynamic RAM (DRAM) or static RAM (SRAM), read-only memory (ROM), erasable programmable read-only memory (EPROM), electrically erasable programmable read-only memory (EEPROM), non-volatile RAM (NVRAM), and magneto-resistive random-access memory (MRAM). The above memory types are for example only, and are thus not limiting as to the types of memory usable for storage of a computer program.

FIG. 5 is a flowchart illustrating an example process 500 for identifying a common point of purchases involved in fraudulent or unauthorized payment transactions, which may be implemented utilizing CPP system 224 (shown in FIG. 2). Process 500 may be implemented by a computing device, for example, CPP computing device 230 (shown in FIG. 2), in cooperation with CPP system 224.

In the example embodiment, method 500 includes receiving 502 transaction data associated with a purchase initiated by a user, the transaction data including a unique merchant identifier, a time stamp, a merchant name identifier, and an account identifier. Method 500 also includes storing 504 the transaction data in a database, performing 506 a look up within the database including parsing the unique merchant identifier, the time stamp, the merchant name identifier, and the account identifier, and building 508 a merchant table including a merchant profile using the unique merchant identifier, the time stamp, the merchant name identifier, and the account identifier. Method 500 further includes receiving 510 a card list from a third party including a plurality of flagged account identifiers, comparing 512 the plurality of flagged account identifiers to the account identifiers in the merchant table, and retrieving 514 at least one of the unique merchant identifier and the merchant name identifier associated with the merchant table account identifiers matched with the flagged account identifiers. Method 500 also includes aggregating 516 the at least one of the unique merchant identifier using the merchant name identifier, and determining 518 a first number of the flagged account identifiers associated with the merchant name identifier.

FIG. 6 illustrates an example configuration of a common point of purchase (CPP) computing device 230 (also shown in FIG. 2) for identifying a common point of purchases involved in fraudulent or unauthorized payment transactions. CPP computing device 230 may include, but is not limited to, processor 605 for executing instructions. In some embodiments, processor 605 is similar to processor 405 (shown in FIG. 4). In the example embodiment, CPP computing device 230 includes executable instructions that are stored in a memory area 610. Processor 605 may include one or more processing units, for example, a multi-core configuration. Memory area 610 is any device allowing information such as executable instructions and/or written works to be stored and retrieved. Memory area 610 may include one or more computer readable media.

CPP computing device 230 includes a processor 605 for executing instructions. Instructions may be stored in a memory area 610, for example. Processor 605 may include one or more processing units (e.g., in a multi-core configuration) for executing instructions. The instructions may be executed within a variety of different operating systems on CPP computing device 230, such as UNIX®, LINUX® (LINUX is a registered trademark of Linus Torvalds), Microsoft Windows®, etc. More specifically, the instructions may cause various data manipulations on a merchant table 628 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 605 is operatively coupled to a communication interface (not shown) such that CPP computing device 230 is capable of communicating with a remote device, such as payment processor 210 (shown in FIG. 2). For example, communication interface may receive communications from client systems 214 and/or third parties (not shown) via the Internet, as illustrated in FIG. 2.

Processor 605 may also be operatively coupled to a storage device 620. Storage device 620 is any computer-operated hardware suitable for storing and/or retrieving data. In some embodiments, storage device 620 is integrated in CPP computing device 230. In other embodiments, storage device 620 is external to CPP computing device 230 and is similar to storage device 434 (shown in FIG. 4). For example, CPP computing device 230 may include one or more hard disk drives as storage device 434. In other embodiments, storage device 620 is external to CPP computing device 230 and may be accessed by a plurality of CPP computing device 230. For example, storage device 620 may include multiple storage units such as hard disks or solid state disks in a redundant array of inexpensive disks (RAID) configuration. Storage device 620 may include a storage area network (SAN) and/or a network attached storage (NAS) system.

In some embodiments, processor 605 is operatively coupled to storage device 620 via a storage interface 622. Storage interface 622 is any component capable of providing processor 605 with access to storage device 620. Storage interface 622 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 605 with access to storage device 620.

In certain embodiments, processor 605 is configured to instruct CPP computing device 230 to generate a card list using PANs received from the third parties. Processor 605 also instructs CPP computing device 230 to build merchant table 628 using stored transaction data. The transaction data may include merchant data 630, which includes at least one unique merchant identifier, at least one transaction time, at least one merchant name identifier, and at least one PAN associated with user 122 (shown in FIG. 1). Processor 605 is also configured to instruct CPP computing device 230 to parse transaction data stored within storage device 620, extract merchant data 630, more specifically, the unique merchant identifiers, the transaction times, the merchant name identifier, and the PANs associated with user 122 from the transaction data, and continuously update merchant table 628 using the extracted transaction data. The card list may include at least one PAN associated with user 122 and a time the PAN might have been compromised and/or breached. Processor 605 may further instruct CPP computing device 230 to compare the card list and merchant table 628 using the PANs in the card list and the PANs in merchant table 628. Processor 605 is further configured to instruct CPP computing device 230 to build a merchant profile utilizing the results of the comparison. This profile may indicate the merchants associated with PANs included in the card list, the merchants flagged as compromised and/or breached, the number of PANs associated with the merchants flagged, and the time the merchants performed a transaction with the PANs included in the card list. This profile may also indicate which merchant locations have been compromised or breached and the times that the merchant locations were compromised and/or breached.

Processor 605 may also instruct CPP computing device 230 to compute a percentage of PANs in the card list that were used at a merchant more than one time. CPP computing device 230 may compute the percentage by unique merchant identifier and/or an aggregate of unique merchant identifier (also referred to as cleansed merchant name). CPP computing device 230 may compute the percentage by unique merchant identifier by adding the number of PANs associated with each retrieved unique merchant identifier and dividing the added number of PANs to the total number of PANs in the card list. CPP computing device 230 may also compute the percentage by aggregate merchant identifier by adding the number of PANs associated with each aggregate merchant identifier and dividing the added number of PANs to the total number of PANs in the card list.

Processor 605 may further instruct CPP computing device 230 to generate a report of merchants that are flagged as being compromised and/or breached. Processor 605 may further sort the report to display, for example, the merchants that are more likely to have been breached first. The merchants that are more like to have been breached are those that have more PANs from the card list associated with them, as explained above.

Memory area 610 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 7:
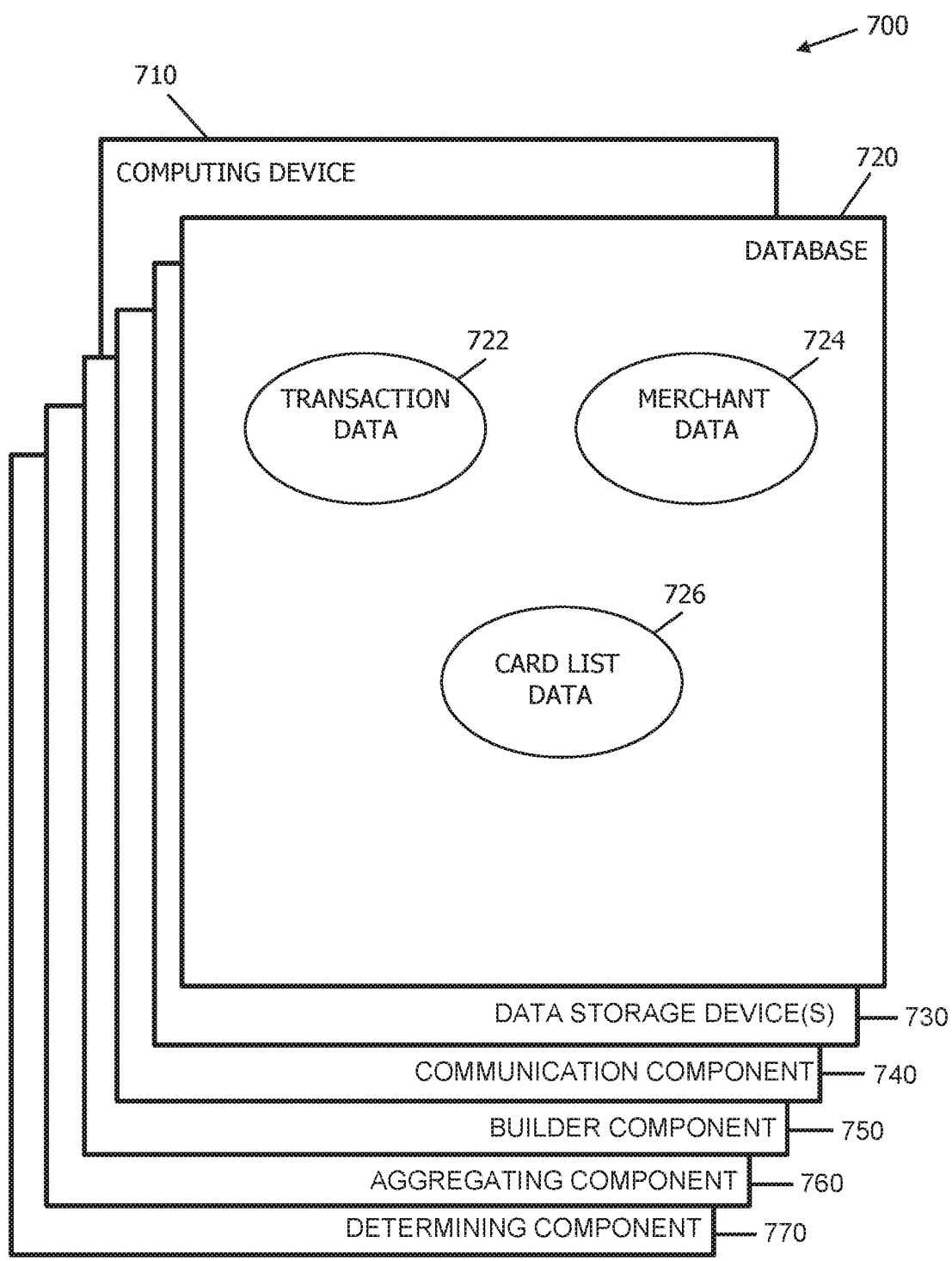

FIG. 7 is a diagram 700 of components of one or more example computing devices that may be used in CPP system 224 shown in FIG. 2. In some embodiments, computing device 710 is similar to CPP computing device 230 (shown in FIG. 2). Database 720 may be coupled with several separate components within computing device 710, which perform specific tasks. In this embodiment, database 720 includes transaction data 722, merchant data 724, and card list data 726. In some embodiments, database 720 is similar to database 220 (shown in FIG. 2).

Computing device 710 includes database 720, as well as data storage devices 730 for storing 504 transaction data within database 720 (shown in FIG. 5). Computing device 710 also includes a communication component 740 for receiving 502 transaction data (shown in FIG. 5), receiving 510 card lists from a third party (shown in FIG. 5), and transmitting, for example, reports of merchants that are flagged as being breached. Computing device 710 also includes a builder component 750 for building 508 a merchant table including a merchant profile (shown in FIG. 5), an aggregating component 760 for aggregating 516 unique merchant identifiers using a merchant name identifier (shown in FIG. 5), and a determining component 770 for determining 518 a number of flagged account identifiers associated with the merchant name identifier.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

While the disclosure has been described in terms of various specific embodiments, those skilled in the art will recognize that the disclosure can be practiced with modification within the spirit and scope of the claims.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

As will be appreciated based on the foregoing specification, the above-described embodiments of the disclosure may be implemented using computer programming or engineering techniques including computer software, firmware, hardware or any combination or subset thereof, wherein the technical effect is a flexible system for various aspects of fraud analysis of payment card transactions. Any such resulting program, having computer-readable code means, may be embodied or provided within one or more computer-readable media, thereby making a computer program product, i.e., an article of manufacture, according to the discussed embodiments of the disclosure. The article of manufacture containing the computer code may be made and/or used by executing the code directly from one medium, by copying the code from one medium to another medium, or by transmitting the code over a network.

In addition, although various elements of the common point of purchase (CPP) computing device are described herein as including general processing and memory devices, it should be understood that the CPP computing device is a specialized computer configured to perform the steps described herein for identifying a common point of purchases involved in fraudulent or unauthorized payment transactions.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial locational differences from the literal language of the claims.

According to the advantageous systems and methods described herein, a payment card network may advantageously monitor public spaces to identify compromised PANs before the compromised PANs are subject to fraudulent use, or significant fraudulent use. Additionally, by regular continual monitoring of compromised PANs, the systems and methods described herein may identify at-risk PANs that are not otherwise known to be compromised, or associated with a known ADC event. The identification of at-risk PANs may be further categorized according to a calculated chi-square indicating the level of risk to which an existing PAN may be exposed (e.g., "low," "medium," "high," "very high," etc.). Using these confidence scores, the payment card issuer bank may advantageously prioritize the order in which at-risk PANs are replaced and/or investigated. Investigations into individual fraud events can be very time-consuming and costly, and the present systems and methods allow a payment card issuer to proactively score potential compromise to their cardholder accounts and replace the associated PANs before significant fraud occurs.

What is claimed is:

1. A common point of purchase (CPP) system for identifying a common point of purchases involved in fraudulent or unauthorized payment transactions comprising a common point of purchase (CPP) computing device, the CPP computing device comprising a processor communicatively coupled to a memory, the CPP computing device configured to:
   receive transaction data stored by a payment processor from a first plurality of transactions processed by the payment processor, the first plurality of transactions initiated by a first plurality of users at a plurality of merchants, the transaction data including, for each of the transactions, a unique merchant identifier, a time stamp, a merchant name identifier, and an account identifier, wherein for a portion of the merchant name identifiers, multiple unique merchant identifiers share a same one of the merchant name identifiers, each of the multiple unique merchant identifiers corresponding to a merchant location of multiple merchant locations of a merchant corresponding to the same merchant name identifier;
   parse the transaction data to identify, for each account identifier, each unique merchant identifier that is associated with the account identifier in at least one of the transactions, and associate each identified unique merchant identifier with the account identifier as a respective account-merchant pair;
   build, in a database, a merchant table including a plurality of records, each record corresponding to one of the account-merchant pairs and including the account identifier from the account-merchant pair, the unique merchant identifier from the account-merchant pair, and the merchant name identifier associated with the unique merchant identifier;
   receive a card list from a third party, the card list including a plurality of flagged account identifiers;
   compare the flagged account identifiers to the account identifiers in the merchant table;
   in response to each match between one of the flagged account identifiers and one of the account identifiers in the merchant table, retrieve i) each unique merchant identifier associated with the one of the flagged account identifiers in the plurality of records of the merchant table, and ii) each merchant name identifier associated with the one of the flagged account identifiers in the plurality of records of the merchant table;
   determine whether one of the retrieved merchant name identifiers is associated with a breach event, including comparing, for each retrieved merchant name identifier, the total number of the flagged account identifiers in the card list to a first number of the flagged account identifiers associated with the retrieved merchant name identifiers in the merchant table, wherein the breach event being associated with one of the retrieved merchant name identifiers indicates a compromise with respect to the corresponding merchant;
   determine whether one or more of the retrieved unique merchant identifiers is associated with the breach event, including comparing, for each retrieved unique merchant identifier, the total number of the flagged account identifiers in the card list to a second number of the flagged account identifiers associated with the retrieved unique merchant identifier in the merchant table, wherein the breach event being associated with one of the retrieved unique merchant identifiers indicates a compromise particular to one of the multiple merchant locations of the corresponding merchant;
   in response to determining that at least one of the one of the retrieved merchant name identifiers and the retrieved unique merchant identifiers is associated with the breach event, flag the one of the retrieved merchant name identifiers;
   receive subsequent transaction data stored by the payment processor from a second plurality of transactions processed by the payment processor, the second plurality of transactions initiated by a second plurality of users at the plurality of merchants;
   continuously update the plurality of records in the merchant table in response to identifying account-merchant pairs included in the subsequent transaction data that were not previously included in the merchant table; and
   cause a client system to display a report identifying the flagged one of the merchant name identifiers and the unique merchant identifiers.

2. The CPP system of claim 1 wherein the flagged account identifiers correspond to account identifiers that have at least been one of compromised and breached.

3. The CPP system of claim 1 further configured to determine that one of the one or more of the retrieved unique merchant identifiers is associated with the breach event based on a percentage of the total number of the flagged account identifiers in the card list that is included in the second number of the flagged account identifiers associated with the unique merchant identifier.

4. The CPP system of claim 1 further configured to determine that one of the one or more of the retrieved unique merchant identifiers is associated with the breach event based on a partial chi-square test of the second number of the flagged account identifiers associated with the unique merchant identifier in view of a total number of account identifiers in the merchant table across all unique merchant identifiers.

5. The CPP system of claim 1 further configured to determine that one of the one or more of the retrieved merchant name identifiers is associated with the breach event based on a partial chi-square test of the first number of the flagged account identifiers associated with the merchant name identifier in view of a total number of account identifiers in the merchant table across all merchant name identifiers.

6. The CPP system of claim 1 further configured to determine that one of the one or more of the retrieved merchant name identifiers is associated with the breach event based on a percentage of the total number of the flagged account identifiers in the card list that is included in the first number of the flagged account identifiers associated with the merchant name identifier.

7. The CPP system of claim 1 further configured to update the merchant table when at least one of the transaction data and the card list is received.

8. A computer-implemented method for identifying a common point of purchases involved in fraudulent or unauthorized payment transactions, said method implemented using a common point of purchase (CPP) computing device in communication with a memory, said method comprising:
   receiving transaction data stored by a payment processor from a first plurality of transactions processed by the payment processor, the first plurality of transactions initiated by a first plurality of users at a plurality of merchants, the transaction data including, for each of the transactions, a unique merchant identifier, a time stamp, a merchant name identifier, and an account identifier, wherein for a portion of the merchant name identifiers, multiple unique merchant identifiers share a same one of the merchant name identifiers, each of the multiple unique merchant identifiers corresponding to a merchant location of multiple merchant locations of a merchant corresponding to the same merchant name identifier;

parsing the transaction data to identify, for each account identifier, each unique merchant identifier that is associated with the account identifier in at least one of the transactions, and associate each identified unique merchant identifier with the account identifier as a respective account-merchant pair;

building, in a database, a merchant table including a plurality of records, each record corresponding to one of the account-merchant pairs and including the account identifier from the account-merchant pair, the unique merchant identifier from the account-merchant pair, and the merchant name identifier associated with the unique merchant identifier;

receiving a card list from a third party, the card list including a plurality of flagged account identifiers;

comparing the flagged account identifiers to the account identifiers in the merchant table;

in response to each match between one of the flagged account identifiers and one of the account identifiers in the merchant table, retrieving i) each unique merchant identifier associated with the one of the flagged account identifiers in the plurality of records of the merchant table, and ii) each merchant name identifier associated with the one of the flagged account identifiers in the plurality of records of the merchant table;

determining whether one of the retrieved merchant name identifiers is associated with a breach event, including comparing, for each retrieved merchant name identifier, a total number of the flagged account identifiers in the card list to a first number of the flagged account identifiers associated with the retrieved merchant name identifiers in the merchant table, wherein the breach event being associated with one of the retrieved merchant name identifiers indicates a compromise with respect to the corresponding merchant;

determining whether one or more of the retrieved unique merchant identifiers is associated with the breach event, including comparing, for each retrieved unique merchant identifier, the total number of the flagged account identifiers in the card list to a second number of the flagged account identifiers associated with the retrieved unique merchant identifier in the merchant table, wherein the breach event being associated with one of the retrieved unique merchant identifiers indicates a compromise particular to one of the multiple merchant locations of the corresponding merchant;

in response to determining that at least one of the one of the retrieved merchant name identifiers and the retrieved unique merchant identifiers is associated with the breach event, flagging the one of the retrieved merchant name identifiers;

receiving subsequent transaction data stored by the payment processor from a second plurality of transactions processed by the payment processor, the second plurality of transactions initiated by a second plurality of users at the plurality of merchants;

continuously updating the plurality of records in the merchant table in response to identifying account-merchant pairs included in the subsequent transaction data that were not previously included in the merchant table; and causing a client system to display a report identifying the flagged one of the merchant name identifiers and the unique merchant identifiers.

9. The method of claim 8 wherein the flagged account identifiers correspond to account identifiers that have at least been one of compromised and breached.

10. The method of claim 8 further comprising determining that one of the one or more of the retrieved unique merchant identifiers is associated with the breach event further based on a percentage of the total number of the flagged account identifiers in the card list that is included in the second number of the flagged account identifiers associated with the unique merchant identifier.

11. The method of claim 8 further comprising determining that one of the one or more of the retrieved unique merchant identifiers is associated with the breach event based on a partial chi-square test of the second number of the flagged account identifiers associated with the unique merchant identifier in view of a total number of account identifiers in the merchant table across all unique merchant identifiers.

12. The method of claim 8 further comprising determining that one of the one or more of the retrieved merchant name identifiers is associated with the breach event based on a partial chi-square test of the first number of the flagged account identifiers associated with the merchant name identifier in view of a total number of account identifiers in the merchant table across all merchant name identifiers.

13. The method of claim 8 further comprising determining that one of the one or more of the retrieved merchant name identifiers is associated with the breach event based on a percentage of the total number of the flagged account identifiers in the card list that is included in the first number of the flagged account identifiers associated with the merchant name identifier.

14. The method of claim 8 further comprising updating the merchant table when at least one of the transaction data and the card list is received.

15. A non-transitory computer-readable storage media having computer-executable instructions embodied thereon, wherein when executed by a common point of purchase (CPP) computing device having at least one processor coupled to at least one memory device, the computer-executable instructions cause the processor to:

receive transaction data stored by a payment processor from a first plurality of transactions processed by the payment processor, the first plurality of transactions initiated by a first plurality of users at a plurality of merchants, the transaction data including, for each of the transactions, a unique merchant identifier, a time stamp, a merchant name identifier, and an account identifier, wherein for a portion of the merchant name identifiers, multiple unique merchant identifiers share a same one of the merchant name identifiers, each of the multiple unique merchant identifiers corresponding to a merchant location of multiple merchant locations of a merchant corresponding to the same merchant name identifier;

parse the transaction data to identify, for each account identifier, each unique merchant identifier that is associated with the account identifier in at least one of the transactions, and associate each identified unique merchant identifier with the account identifier as a respective account-merchant pair;

build, in a database, a merchant table including a plurality of records, each record corresponding to one of the account-merchant pairs and including the account identifier from the account-merchant pair, the unique merchant identifier from the account-merchant pair, and the merchant name identifier associated with the unique merchant identifier;

receive a card list from a third party, the card list including a plurality of flagged account identifiers;

compare the flagged account identifiers to the account identifiers in the merchant table;

in response to each match between one of the flagged account identifiers and one of the account identifiers in the merchant table, retrieve i) each unique merchant identifier associated with the one of the flagged account identifiers in the plurality of records of the merchant table, and ii) each merchant name identifier associated with the one of the flagged account identifiers in the plurality of records of the merchant table;

determine whether one of the retrieved merchant name identifiers is associated with a breach event, including comparing, for each retrieved merchant name identifier, a total number of the flagged account identifiers in the card list to a first number of the flagged account identifiers associated with the retrieved merchant name identifiers in the merchant table, wherein the breach event being associated with one of the retrieved merchant name identifiers indicates a compromise with respect to the corresponding merchant;

determine whether one or more of the retrieved unique merchant identifiers is associated with the breach event, including comparing, for each retrieved unique merchant identifier, the total number of the flagged account identifiers in the card list to a second number of the flagged account identifiers associated with the retrieved unique merchant identifier in the merchant table, wherein the breach event being associated with one of the retrieved unique merchant identifiers indicates a compromise particular to one of the multiple merchant locations of the corresponding merchant;

in response to determining that at least one of the one of the retrieved merchant name identifiers and the retrieved unique merchant identifiers is associated with the breach event, flag the one of the retrieved merchant name identifiers;

receive subsequent transaction data stored by the payment processor from a second plurality of transactions processed by the payment processor, the second plurality of transactions initiated by a second plurality of users at the plurality of merchants;

continuously update the plurality of records in the merchant table in response to identifying account-merchant pairs included in the subsequent transaction data that were not previously included in the merchant table; and cause a client system to display a report identifying the flagged one of the merchant name identifiers and the unique merchant identifiers.

16. The computer-executable instructions of claim 15 wherein the flagged account identifiers correspond to account identifiers that have at least been one of compromised and breached.

17. The computer-executable instructions of claim 15 further cause the processor to determine that one of the one or more of the retrieved unique merchant identifiers is associated with the breach event based on a percentage of the total number of the flagged account identifiers in the card list that is included in the second number of the flagged account identifiers associated with the unique merchant identifier.

18. The computer-executable instructions of claim 15 further cause the processor to determine that one of the one or more of the retrieved unique merchant identifiers is associated with the breach event based on a partial chi-square test of the second number of the flagged account identifiers associated with the unique merchant identifier in view of a total number of account identifiers in the merchant table across all unique merchant identifiers.

19. The computer-executable instructions of claim 15 further cause the processor to determine that one of the one or more of the retrieved merchant name identifiers is associated with the breach event based on a partial chi-square test of the first number of the flagged account identifiers associated with the merchant name identifier in view of a total number of account identifiers in the merchant table across all merchant name identifiers.

20. The computer-executable instructions of claim 15 further cause the processor to determine that one of the one or more of the retrieved merchant name identifiers is associated with the breach event based on a percentage of the total number of the flagged account identifiers in the card list that is included in the first number of the flagged account identifiers associated with the merchant name identifier.

21. The computer-executable instructions of claim 15 further cause the processor to update the merchant table when at least one of the transaction data and the card list is received.

* * * * *